United States Patent
Pak et al.

(10) Patent No.: US 6,718,469 B2
(45) Date of Patent: Apr. 6, 2004

(54) SYSTEM AND METHOD FOR EXECUTING COMPUTER VIRUS DEFINITIONS CONTAINING GENERAL PURPOSE PROGRAMMING LANGUAGE EXTENSIONS

(75) Inventors: Michael Chin-Hwan Pak, Portland, OR (US); Andrei Ouchakov, Aloha, OR (US); Khai Nhu Pham, Beaverton, OR (US); Dmitry O. Gryaznov, Portland, OR (US); Victor Kouznetsov, Aloha, OR (US)

(73) Assignee: Networks Associates Technology, Inc., Santa Clara, CA (US)

( * ) Notice: Subject to any disclaimer, the term of this patent is extended or adjusted under 35 U.S.C. 154(b) by 429 days.

(21) Appl. No.: 09/920,065

(22) Filed: Aug. 1, 2001

(65) Prior Publication Data

US 2003/0028785 A1 Feb. 6, 2003

(51) Int. Cl.$^7$ .............................................. G06F 17/30
(52) U.S. Cl. ..................... 713/200; 713/188; 707/200
(58) Field of Search .................. 713/200, 201, 713/176, 187, 188; 714/28, 38, 54, 33; 707/10, 100, 102, 104.1, 200; 715/500

(56) References Cited

U.S. PATENT DOCUMENTS

| | | | | | |
|---|---|---|---|---|---|
| 5,440,723 | A | * | 8/1995 | Arnold et al. | 714/2 |
| 5,452,442 | A | * | 9/1995 | Kephart | 714/38 |
| 5,832,208 | A | * | 11/1998 | Chen et al. | 713/201 |
| 6,622,150 | B1 | * | 9/2003 | Kouznetsov et al. | 707/200 |

* cited by examiner

*Primary Examiner*—Ly V. Hua
(74) *Attorney, Agent, or Firm*—Patrick J. S. Inouye; Christopher J. Hamaty (57) ABSTRACT

A system and method for executing computer virus definitions containing general purpose programming language extensions is described. One or more virus definition records are stored in a computer virus data file. Each virus definition record includes an identifier, a virus detection section and an extension sentence. The identifier uniquely identifies a computer virus. The virus detection section includes object code providing operations to detect the identified computer virus within a computer system. The extension sentence includes object code providing reusable operations implemented in a general purpose computing language. For each virus definition record, at least one of the object code of the virus detection section and the extension sentence is interpreted.

29 Claims, 6 Drawing Sheets

90

| 91 | 92 | 93 | 94 | 95 |
|---|---|---|---|---|
| ID | Names | Detection Section | Removal Section (Optional) | C Language Extension |

SYSTEM AND METHOD FOR EXECUTING COMPUTER VIRUS DEFINITIONS CONTAINING GENERAL PURPOSE PROGRAMMING LANGUAGE EXTENSIONS

FIELD OF THE INVENTION

The present invention relates in general to computer anti-virus protection and, in particular, to systems and methods for executing computer virus definitions containing general purpose programming language extensions.

BACKGROUND OF THE INVENTION

Computer viruses are executable files or attachments often hidden or disguised as legitimate files or messages. More precisely, computer viruses include any form of self-replicating computer code which can be stored, disseminated, and directly or indirectly executed by unsuspecting clients. Viruses travel between machines over network connections or via infected media and cause malicious and sometimes destructive results. Viruses can be executable program or macro code disguised as application programs, functions, macros, electronic mail attachments, and even applets and hypertext links.

The earliest computer viruses infected boot sectors and files. Over time, computer viruses evolved into numerous types, including cavity, cluster, companion, direct action, encrypting, multipartite, mutating, polymorphic, overwriting, self-garbling, and stealth viruses, such as described in "Virus Information Library," Networks Associates Technology, Inc., (2001), the disclosure of which is incorporated by reference. Recently, macro viruses have become popular. These viruses are written as scripts in macro programming languages and are attached to documents and electronic mail attachments.

Historically anti-virus solutions have reflected the sophistication of the viruses being combated. The first anti-virus solutions were stand-alone programs for identifying and disabling viruses. Eventually, anti-virus solutions grew to include special purpose functions and parameterized variables that could be stored in data files read by the anti-virus engine. Over time, the special purpose functions evolved into specialized anti-virus languages for defining virus scanning and cleaning, including removal and disablement, instructions.

The data files store virus definitions. Each virus definition includes object code executed by an anti-virus engine on each client. As new computer viruses are discovered daily, each data file must be periodically updated to add new computer virus definitions, and replace or delete old virus definitions. Over time, data files tend to become large and can take excessive amounts of time to download. Long download times are particularly problematic on low bandwidth connections or in corporate computing environments having a large user base. Data files are also often platform-dependent and updates must be hard-coded into each different type of data file.

Upgrading anti-virus engines in a corporate computing environment can require considerable effort and time. Each anti-virus engine is limited to performing only those operations defined in the associated anti-virus language. Consequently, any changes or extensions to the language typically require the patching or replacement of the engine and can consume considerable resources in debugging and testing. In addition, anti-virus engines are implemented for specific computing environments, generally dependent on the type and version of operating system. Changes or upgrades to an anti-virus engine, therefore, must be propagated across all computing platforms and can present critical portability issues.

One prior art approach avoids the need to patch or replace the anti-virus engine by including the engine as part of the data files. Each new virus definition accordingly results in a new engine. However, such an approach to upgrading is slow and bandwidth-intensive. As well, including an anti-virus engine as part of a computer virus definition data file is misleading, as security policies controlling software download and installation are subverted.

Therefore, there is a need for an approach to providing a flexible and extensible anti-virus solution that avoids the limitations of a special purpose anti-virus language and the limited capabilities of the corresponding anti-virus engine. Preferably, such an approach would provide an anti-virus engine capable of executing general purpose programming language extensions.

There is a further need for an approach to providing a legacy-based anti-virus solution that preserves the user base of installed anti-virus engines, while providing a richer operation feature set. Preferably, such an approach would present a platform-independent means for extending data file functionality without hard-coding platform-specific changes into individual data files.

SUMMARY OF THE INVENTION

The present invention provides a system and method for embedding and interpreting general purpose programming language extensions included within a script written in an anti-virus language. The source code for the general purpose programming language extension is embedded in a source data file containing computer virus definitions and instructions written in the anti-virus language. The general purpose programming language extensions are delimited by verbs added to the grammar of the anti-virus language to support the execution of general purpose programming language extensions. The extensions are compiled by a compiler for the general purpose programming language and object code is generated. Computer virus definitions and object code for the compiled anti-virus language script and general purpose programming language extension are consolidated into a data file. The data file is interpreted by an anti-virus engine on a client and any embedded object code for the general purpose programming language is interpreted by a separate interpreter.

An embodiment of the present invention is a system and a method for executing computer virus definitions containing general purpose programming language extensions. One or more virus definition records are stored in a computer virus data file. Each virus definition record includes an identifier, a virus detection section and an extension sentence. The identifier uniquely identifies a computer virus. The virus detection section includes object code providing operations to detect the identified computer virus within a computer system. The extension sentence includes object code providing reusable operations implemented in a general purpose computing language. For each virus definition record, at least one of the object code of the virus detection section and the extension sentence is interpreted.

Accordingly, the capabilities of the anti-virus engine are enhanced with the ability to include the richer feature set provided by the general purpose programming language without having to modify the functionality of the anti-virus engine itself.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
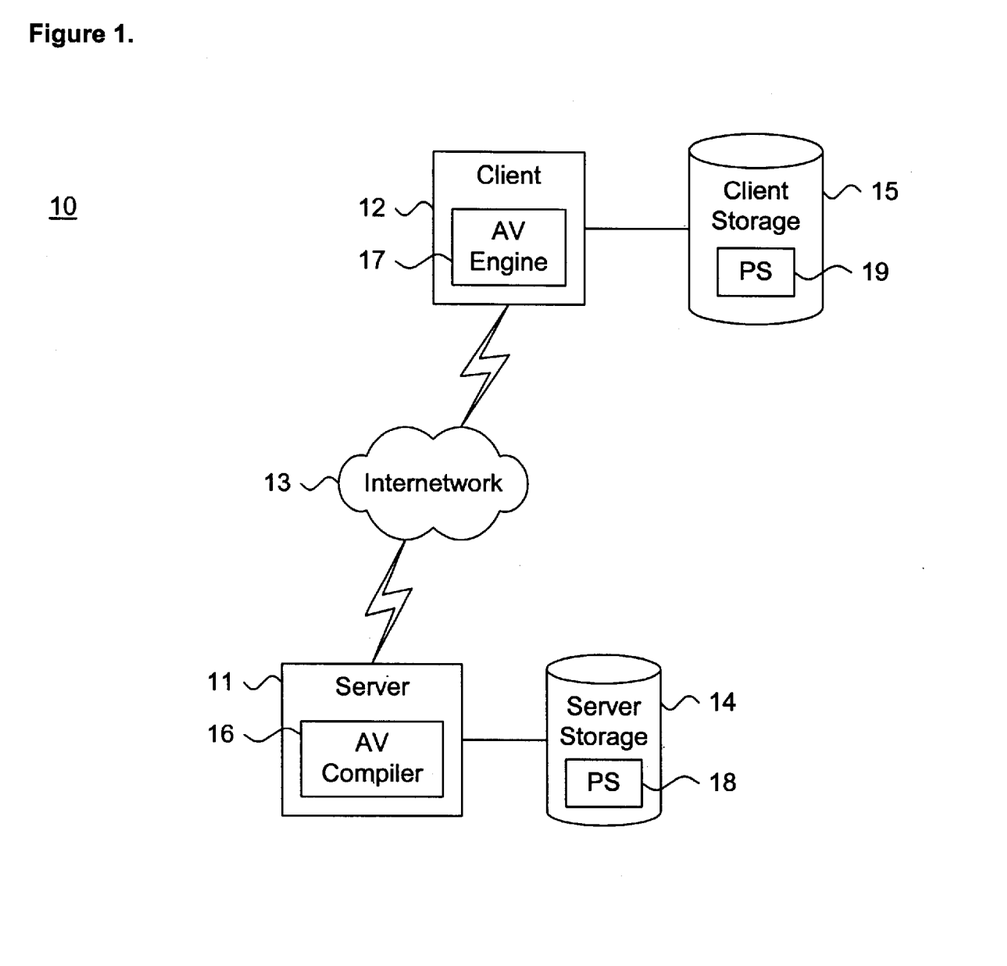
FIG. 1 is a block diagram showing a networked computing environment, including a system for executing computer virus definitions containing general purpose programming language extensions, in accordance with the present invention.

FIG. 1 is a block diagram showing a networked computing environment 10, including a system for executing computer virus definitions containing general purpose programming language extensions, in accordance with the present invention. The networked computing environment 10 includes a server 11 interconnected to a client 12 via an internetwork 13. The server 11 provides client services, such as information retrieval and file service. Alternatively, the interconnection could be with a direct connection, over a dialup connection, via an intranetwork, or by a combination of the foregoing or with various other network configurations and topologies, as would be recognized by one skilled in the art.

The server 11 includes a persistent store 18 maintained on a server storage device 14. Individual directories, files, and databases are stored under the file system 18. Suitable persistent storage devices include randomly accessible devices, such as hard drives and rewriteable media, although other forms of persistent storage devices could also be used by or incorporated into the server 11. Similarly, the client 12 also includes a persistent store 19 maintained on a client storage device 15.

The client 12 can potentially be exposed to computer viruses by virtue of having interconnectivity with outside machines. As protection, the client 12 includes an anti-virus (AV) engine 17 that executes operations to scan for the presence of and to clean off computer viruses, particularly as found in the persistent store. An exemplary anti-virus engine 17 is the VirusScan product, licensed by Networks Associates Technology, Inc., Santa Clara, Calif. As further described below beginning with reference to FIG. 2, the anti-virus engine 17 reads in a data file stored in the persistent store containing virus definitions and object code for the anti-virus engine 17 to identify and remove computer viruses. Each data file also includes object code compiled from a general purpose programming language.

The computer virus data files must be periodically updated with new computer virus definitions and code to enable the anti-virus engine 17 to continue to provide up-to-date anti-virus protection. Thus, the server 11 includes an anti-virus (AV) compiler 16 that executes an updating service. The client 12 can connect to the server 11 and download updated external virus definition files from the anti-virus compiler 16 for subsequent incorporation into a structured virus database.

The individual computer systems, including server 11 and client 12, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
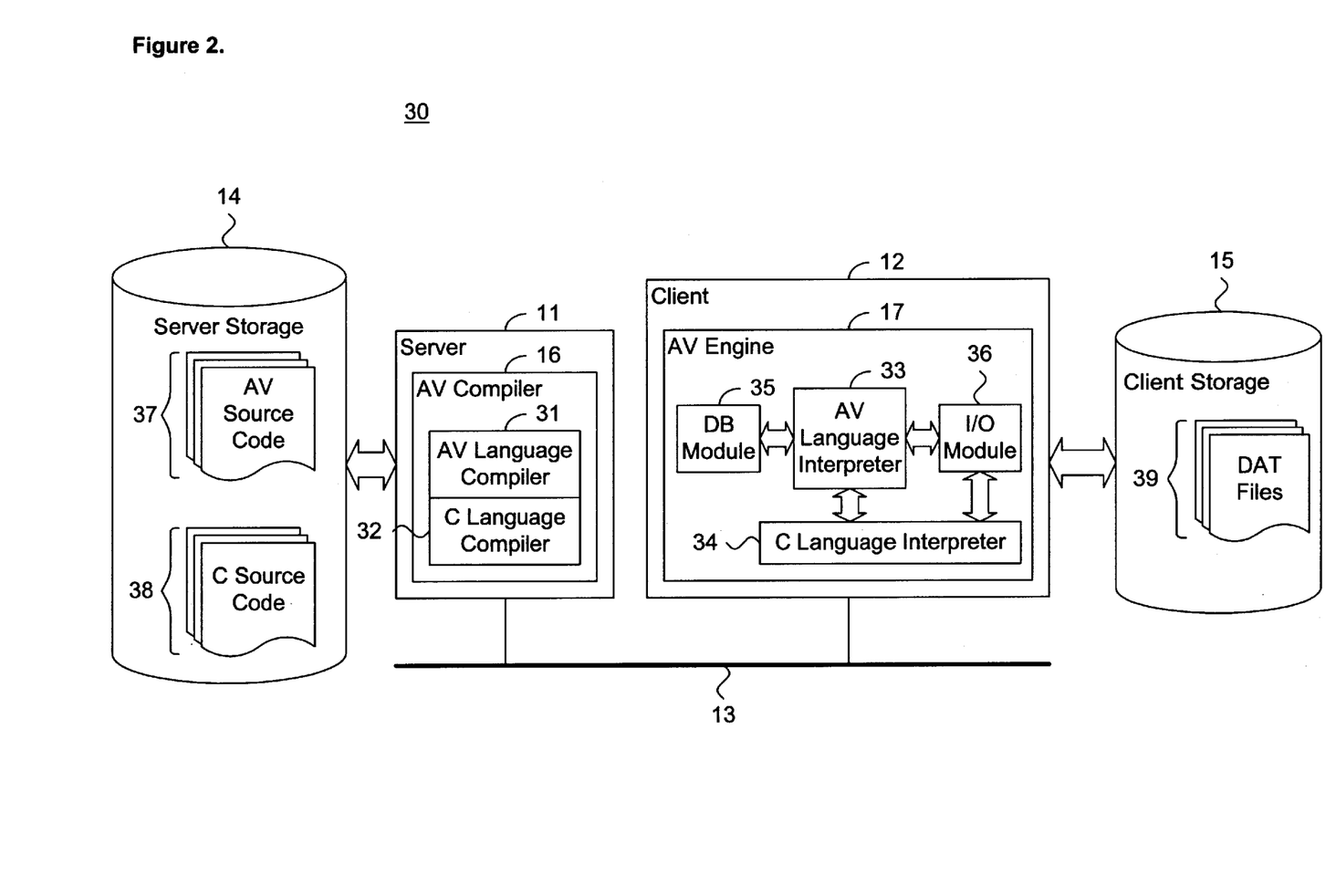
FIG. 2 is a block diagram showing a system for executing computer virus definitions containing general purpose programming language extensions.

FIG. 2 is a block diagram showing a system 30 for executing computer virus definitions containing general purpose programming language extensions. The system 30 includes the server 11 and client 12 with persistent storage devices. The server 11 executes an anti-virus compiler 16 that is used to generate the DAT files 39 from anti-virus (AV) source code 37 and C source code 38. The client 12 executes an anti-virus engine 17 and periodically interfaces to the server 11 over the internetwork 13, or other such form of interconnection, to receive anti-virus data (DAT) file 39 updates. The anti-virus engine 17 scans and cleans files and attachments stored in the client storage 15.

The anti-virus engine 17 consists of four functional modules: anti-virus (AV) language interpreter 33, C language interpreter 34, database (DB) module 35 and input/output (I/O) module 36. Each DAT file 39 includes virus definitions and anti-virus object code plus object code for one or more extensions written in a general purpose programming language, such as a C programming language as used in the described embodiment.

The anti-virus language interpreter 33 reads the anti-virus object code in each DAT file 39 and interprets the operations encoded therein. The anti-virus operations include instructions for identifying and removing or neutralizing computer viruses infecting the files or attachments stored in the client storage 15. The anti-virus language interpreter 33 is limited to performing those operations specified by the anti-virus language. Therefore, the utility of the anti-virus engine 17 is constrained by the flexibility of the anti-virus language interpreter 33.

The C language interpreter 34 removes the restrictions implicit in the anti-virus language by allowing the anti-virus engine 17 to execute extensions implemented in a general purpose programming language. In the described embodiment, the extensions are implemented in the C programming language, although one skilled in the art would recognize that other general purpose programming languages could also be used.

The individual DAT files 39 are organized into a structured storage scheme that is accessed via the database module 35. The file system of the client storage 15 is accessed via the input/output module 36 which retrieves target files and attachments for examination by the anti-virus language interpreter 33 and C language interpreter 34.

The anti-virus compiler 16 consists of two functional modules: anti-virus (AV) language compiler 31 and C language compiler 32. The anti-virus language compiler 31 reads in anti-virus source code 37 stored in the server storage 14. Individual segments of C source code 38 can be included within the anti-virus source code 37 for compilation by the C language compiler 32. Each embedded C language source C segment is delimited within the anti-virus source code 37 using standardized keywords, as further described below with reference to FIG. 3.

Each module is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The anti-virus compiler 16 and the anti-virus engine 17 operate in accordance with a sequence of process steps, as further described below with reference to FIGS. 7 and 8, respectively.

Figure 3:
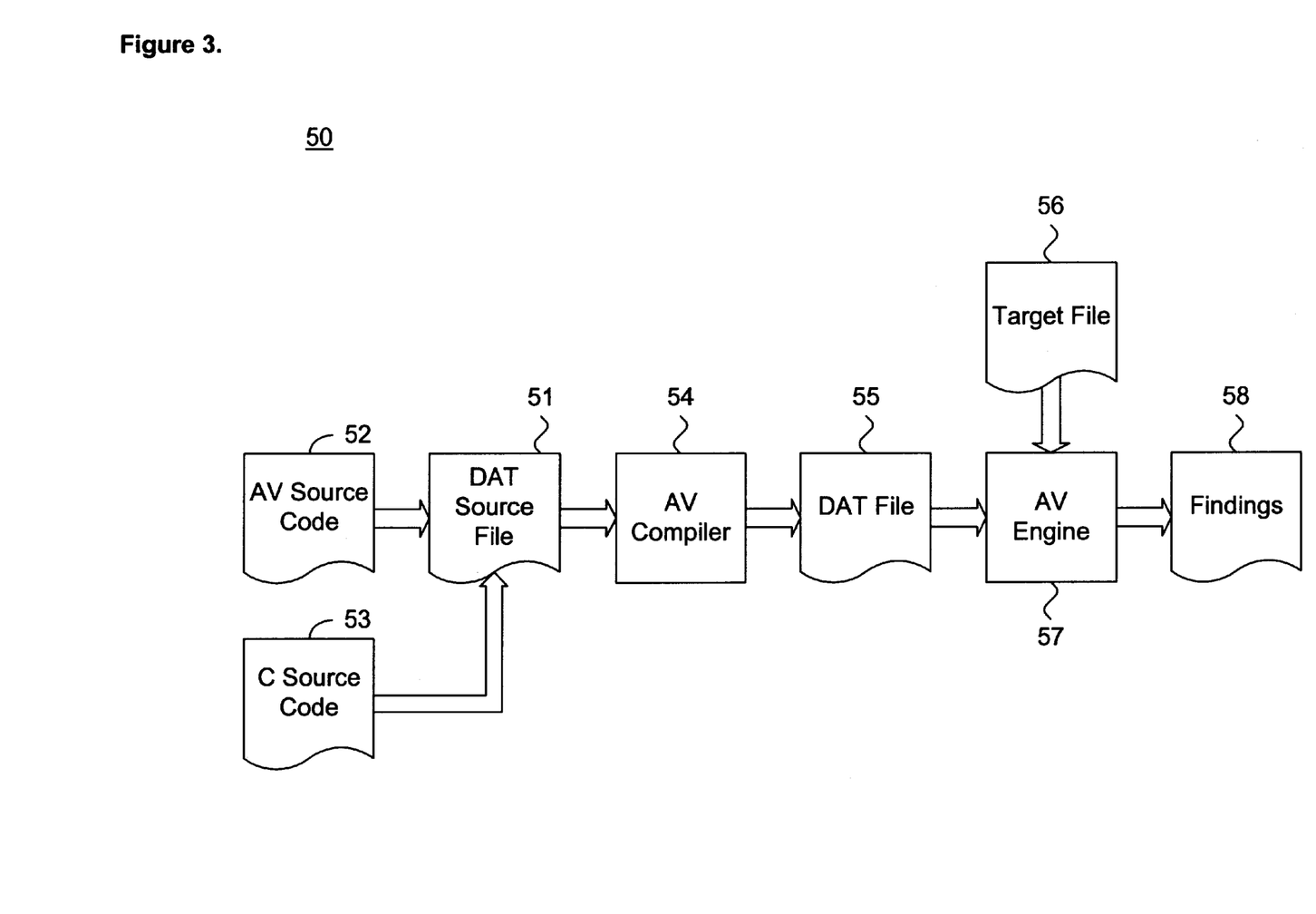
FIG. 3 is a process diagram showing, by way of example, the compilation and use of computer virus DAT files.

FIG. 3 is a process diagram 50 showing, by way of example, the compilation and use of computer virus DAT files. Each DAT file 55 is generated from a DAT source file 51. The DAT source file 51 contains anti-virus source code 52 and C source code 53. The AV source code 52 specifies instructions written in the anti-virus language supported by the anti-virus engine 57 for identifying and removing known computer viruses. The set of instructions for each virus is known as a "driver." The C language source code 53 includes instructions written, for example, in the C programming language for augmenting the functionality of the anti-virus engine 57 to allow other forms of virus detection and correction, particularly those exceeding the inherent capabilities of the anti-virus engine 57. To support general purpose programming language extensions, the grammar of the anti-virus language used in the described embodiment has been extended to include several new verbs as follows:

cbegin, cend: All C source code is delimited between these two verbs and no anti-virus language verbs are allowed between cbegin and cend.

crunlimit <hex value>: This verb limits the number of bytecode instructions to execute to <hex value>. If this verb is not present, the default value (0xFFFFFFFF/2) is used. This verb must be used before the cbegin and cend pair.

cifeggoto <hex value><label>: This verb tests the return value of the main function. If the return result is equal to <value> jump to <label>.

cifneggoto <hex value><label>: This verb also tests the return value of the main function. If the return result is not equal to <value> jump to <label>. Note: <label> must be explicitly declared with a corresponding target verb.

ccall <driver name>: This verb executes the main( ) routine of a C library for the identified <driver name> and can be applied repeatedly to maximize code reuse.

The anti-virus compiler 54 compiles the DAT source file 51 into a DAT file 55. The C language source code 53 is delimited from the anti-virus source code 52 and, upon encountering a delimiter, the anti-virus compiler 54 will preprocess and mark the C source code 53 for compilation using the C compiler 32 (shown in FIG. 2).

In the described embodiment, the C compiler 32 is based on the Micro-C compiler described in D. R. Hanson, et al., "A Retargetable C Compiler: Design and Implementation," Addison-Wesley (1995), the disclosure of which is incorporated by reference. The Micro-C compiler supports the entire C language syntax but does not include a link editor. Consequently, the anti-virus compiler 54 provides the necessary link editing functionality.

As implemented, the C compiler 32 supports reusable object code that can be consolidated into libraries for use by multiple anti-virus drivers. Through code re-use, C language functions can be invoked from anti-virus language calls or from other C language functions. C language code can also be reused in other C language functions by including function prototypes. The anti-virus compiler 54 links the additional functions during compilation. In addition, the C language functions can be nested and can store and return values and data structures.

The C compiler 32 also supports emulator callbacks. These allow the anti-virus engine 17 (shown in FIG. 1) to handle interrupts and exceptions and platform-specific application programming interface calls. The complete functional specification of the C compiler 32 is described in "Micro-C Reference," Networks Associates Technology, Inc., Santa Clara, Calif. (May 29, 2001), the disclosure of which is incorporated by reference.

On the client end, the anti-virus engine 57 receives and reads a DAT file 55. A target file (or attachment) 56 is retrieved and examined for the presence of a computer virus using the virus definitions embedded into the DAT file 55. Any findings 58 are communicated back to the user.

By way of example, an anti-virus language script including an embedded C language segment is shown below:

name nvirus qhit excel "X97M/Dummy"; does nothing
noquick
crunlimit 100
cbegin
int main (void) {return 1;}
cend
cifeggoto 1"TRUE"
find 03 04; never executed
target "TRUE"
bufferseek "dummy"
remove
check "" 2b6 209
xchec
deleteexcelmacro "dummy"
end As shown, the example anti-virus script will search for a fictitious macro virus called "X97 M/Dummy" for Microsoft Excel spreadsheets. The actual C language extension consists of a one-line program "int main (void) {return 1;}." The remainder of the script supports the processing of the return value of the C language segment and removal of the "virus."

Figure 4:
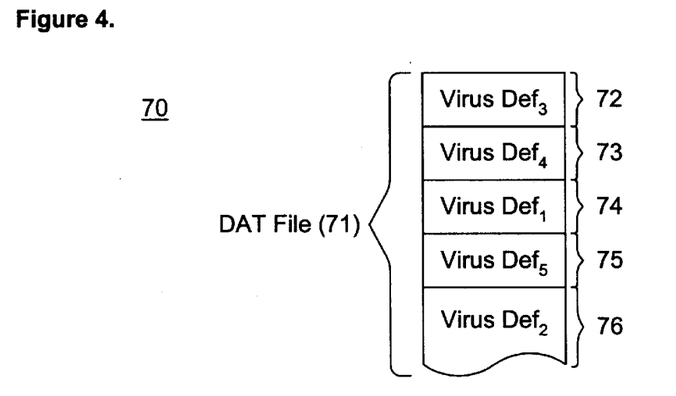
FIG. 4 is a block diagram showing the format of a computer virus DAT file for use by the anti-virus engine of FIG. 2.

FIG. 4 is a block diagram showing the format 70 of a computer virus DAT file 71 for use by the anti-virus engine 17 of FIG. 2. Each DAT file 71 stores individual virus definitions 72–76 using an ordering optimized for speed in virus scanning. In the described embodiment, each DAT file 71 consists of three individual virus definition sets: scan, clean, and names, although these sets can be logically viewed as a single consolidated file. The individual virus definitions 71–76 are ordered within the DAT file 71 for optimal retrieval. Thus, the DAT file 71 stores the virus definitions 72–76, for example, in order of third, fourth, first, fifth and second viruses. Other orderings or forms of organization are feasible.

Figure 5:
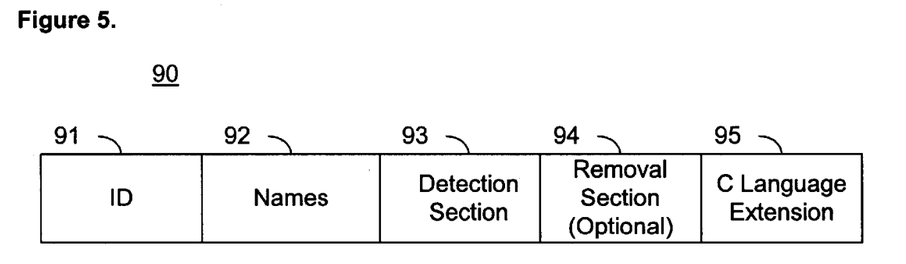
FIG. 5 is a block diagram showing the format of a virus definition record as stored in the virus definitions of FIG. 4.

FIG. 5 is a block diagram showing the format of a virus definition record 90 as stored in the virus definitions 72–76 of FIG. 4. Each record 90 consists of 5 fields: identifier (ID) 91, names 92, detection section 93, an optional removal section 94, and C language extension 95. The identifier field 91 uniquely identifies the computer virus described by the record 90. The names field 92 contains at least one virus name associated with the computer virus. The detection section 93 stores object code that provides operations written in the anti-virus language to detect the computer virus within the file or attachment being scanned. The virus removal section 94 is optional and stores object code written in the anti-virus language providing operations to clean the identified computer virus from the scanned machine. Alternatively, the virus removal section 94 could contain a null operation, such as when no action need be taken to address the presence of a virus. Finally, the C language extension 95 stores object code written, by way of example, in the C programming language providing operations to identify, clean or both the computer virus. Other organizations and record formats could also be used. In addition, one skilled in the art would recognize that the use of the C programming language is merely illustrative and not meant to be limitative. Other general purpose programming languages could also be used.

Figure 6:
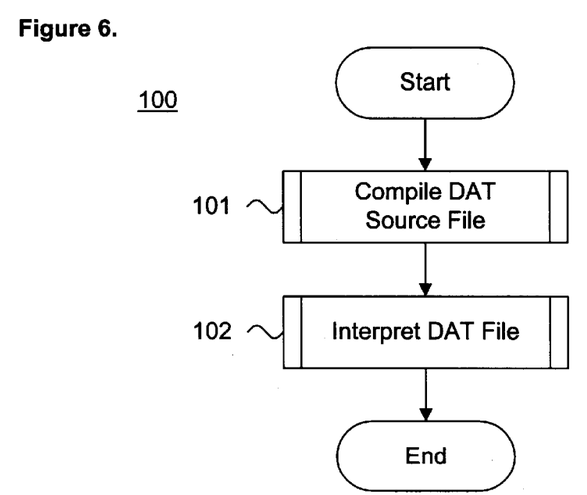
FIG. 6 is a flow diagram showing a method for executing computer virus definitions containing general purpose programming language extensions in accordance with the present invention.

FIG. 6 is a flow diagram showing a method for executing computer virus definitions containing general purpose programming language extensions 100 in accordance with the present invention. The method logically starts with the operations performed by the server 11 (block 101) and client (block 102), as further described below with reference to FIGS. 7 and 8, respectively. In practice, the server 11 and client 12 operate independently without express synchronization or coordination. However, both systems must be operating to perform a complete virus identification and removal procedure.

Figure 7:
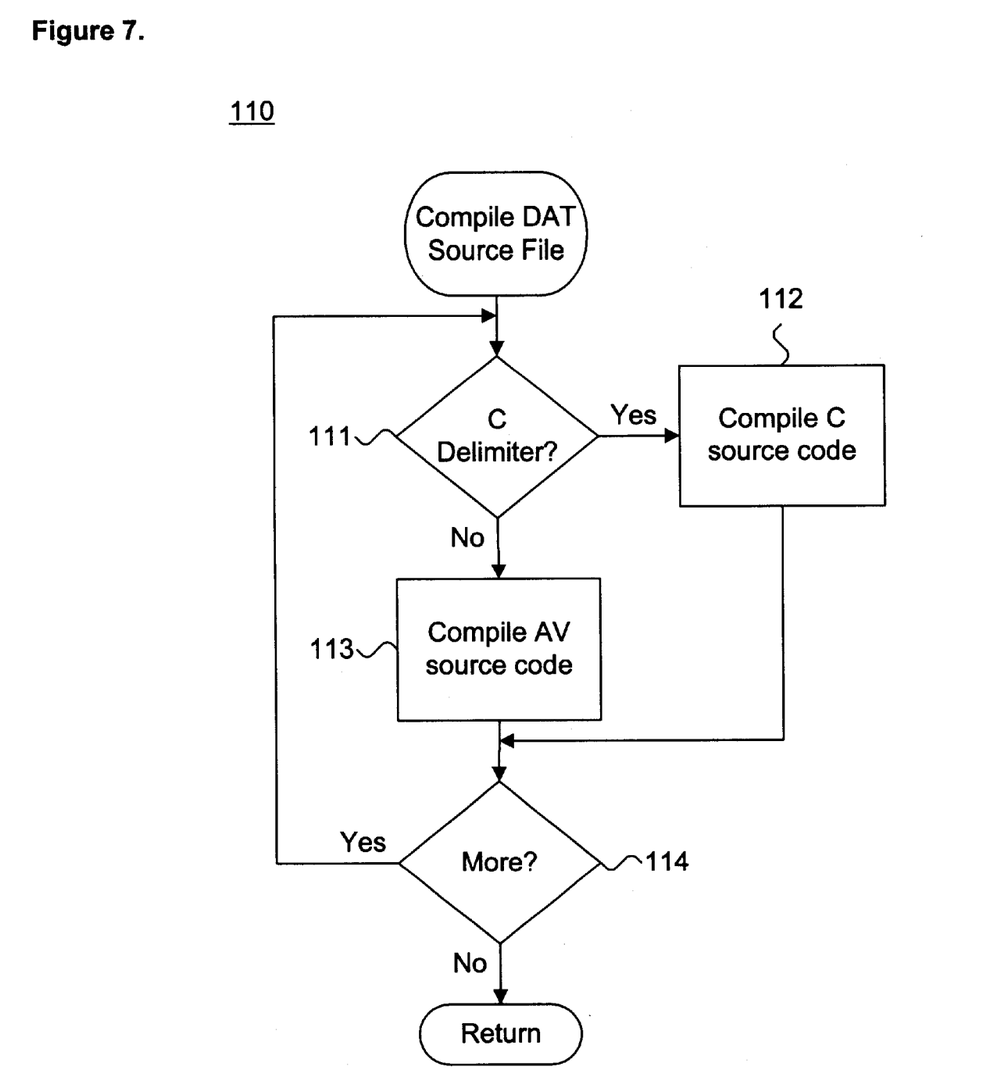
FIG. 7 is a flow diagram showing a routine for compiling a DAT file for use in the method of FIG. 6.

FIG. 7 is a flow diagram showing a routine 110 for compiling a DAT file 55 (shown in FIG. 3) for use in the method of FIG. 6. The purpose of this routine is to identify any embedded C language extensions for appropriate compilation.

Thus, if the anti-virus compiler 54 (shown in FIG. 3) encounters a delimiter in the DAT source file 51, that is, cbegin (block 111), the C source code 53 is compiled using the C language compiler 32 (shown in FIG. 2) (block 112) to generate object code. In the described embodiment, the verbs cbegin and cend respectively delimit the beginning and ending of C source code.

Otherwise, if standard anti-virus language source code is encountered (block 111), the anti-virus source code 52 is compiled by the anti-virus language compiler 31 (block 113). The line-by-line compilation of the DAT source file 51 continues while more source code is found (block 114), after which the routine returns.

Figure 8:
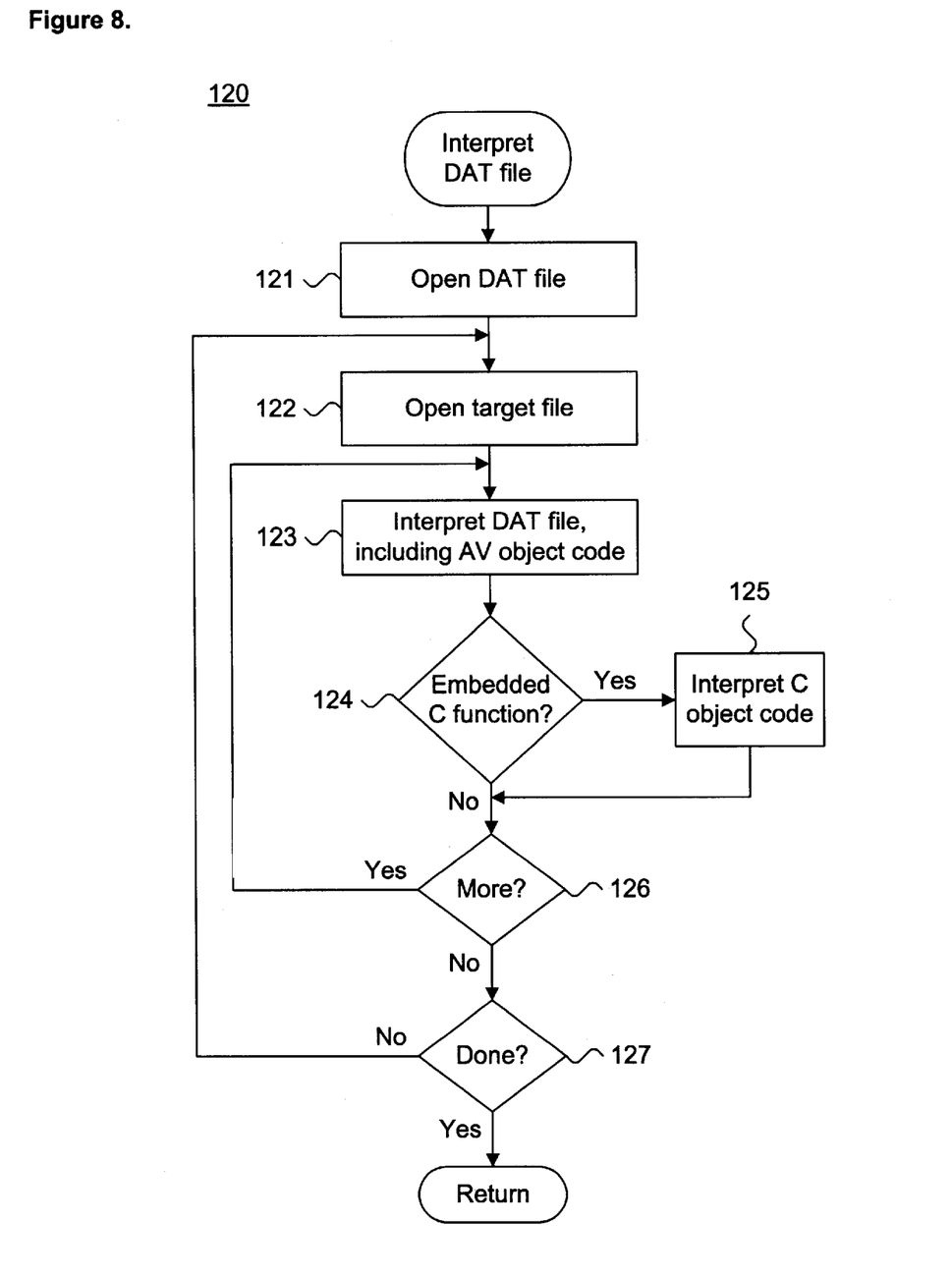
FIG. 8 is a flow diagram showing a method for interpreting a DAT file for use in the method of FIG. 6.

FIG. 8 is a flow diagram showing a method for interpreting a DAT file 455 (shown in FIG. 3) for use in the method of FIG. 6. The purpose of this routine is to interpret both anti-virus and C object code to identify and disable computer viruses in a target file or attachment.

Thus, a DAT file 55 is opened by the AV engine 57 (block 121). The target file (or attachment) is opened (block 122) and the DAT file 55 is interpreted by the AV engine 57, including any AV object code encountered therein (block 123). If an embedded C language function is encountered (block 124), the C language object code is interpreted by the C language interpreter 34 (shown in FIG. 2) (block 125). The interpretation of the DAT file 55 continues, while more object code in the DAT file 55 remains (block 126). Processing continues (blocks 122–126) while the anti-virus engine 57 completes all target files and attachments (block 127). The routine then returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for executing computer virus definitions containing general purpose programming language extensions, comprising:
   a computer virus data file storing one or more virus definition records, each virus definition record comprising:
      an identifier uniquely identifying a computer virus;
      a virus detection section comprising object code providing operations to detect the identified computer virus within a computer system; and
      an extension sentence comprising object code providing reusable operations implemented in a general purpose computing language; and
   an anti-virus engine interpreting, for each virus definition record, at least one of the object code of the virus detection section and the extension sentence.

2. A system according to claim 1, further comprising:
   at least one object code module implemented in the general purpose computing language into a library usable by a plurality of calls from the object code of the virus detection section.

3. A system according to claim 1, further comprising:
   operations specified in the general purpose programming language to handle at least one of interrupts, exceptions and platform-dependent application programming interface callbacks.

4. A system according to claim 1, further comprising:
   source virus definitions, each comprising source code specified in the general purpose programming language.

5. A system according to claim 4, wherein the general purpose programming language is the C programming language.

6. A system according to claim 1, further comprising:
   a database module associating at least one virus name with each virus definition record and indexing the virus definition records in the virus data file by the at least one virus name.

7. A system according to claim 1, further comprising:
   an input/output module accessing at least one of a file or attachment on the computer system for each virus definition record.

8. A system according to claim 1, further comprising:
   an anti-virus language interpreter detecting an infection of the computer system by the identified computer virus by executing the virus definition string for each accessed virus definition record.

9. A system according to claim 1, further comprising:
   a general purpose programming language interpreter detecting an infection of the computer system by the identified computer virus by executing the object code of the extension sentence for each accessed virus definition record.

10. A system according to claim 1, further comprising:
    a virus removal section comprising object code providing operations to neutralize the identified computer virus.

11. A system according to claim 10, further comprising:
an anti-virus language interpreter performing at least one of a removal and disablement of the identified computer virus upon the infection of the computer system by executing the virus removal section for each accessed virus definition record.

12. A system according to claim 1, further comprising:
a general purpose programming language interpreter performing at least one of a removal and disablement of the identified computer virus upon the infection of the computer system by executing the object code of the extension sentence for each accessed virus definition record.

13. A system according to claim 1, further comprising:
an anti-virus language source file storing one or more virus definitions, each virus definition comprising source code written in an anti-virus language, the source code comprising:
  instructions to detect the identified computer virus within a computer system; and
  instructions for at least one of removing the identified computer virus from and disabling the identified computer virus on the computer system; and
an anti-virus language compiler converting the virus definitions into the object code comprised in the virus detection section and the virus removal section.

14. A system according to claim 1, further comprising:
a general purpose computing language source file storing one or more virus definitions, each virus definition comprising source code written in a general purpose computing language, the source code comprising at least one of:
  instructions to detect the identified computer virus within a computer system; and
  instructions for at least one of removing the identified computer virus from and disabling the identified computer virus on the computer system; and
a general purpose computing language compiler converting the virus definitions into the object code of the extension sentence.

15. A method for executing computer virus definitions containing general purpose programming language extensions, comprising:
storing one or more virus definition records in a computer virus data file, each virus definition record comprising:
  an identifier uniquely identifying a computer virus;
  a virus detection section comprising object code providing operations to detect the identified computer virus within a computer system; and
  an extension sentence comprising object code providing reusable operations implemented in a general purpose computing language; and
interpreting, for each virus definition record, at least one of the object code of the virus detection section and the extension sentence.

16. A method according to claim 15, further comprising:
forming at least one object code module implemented in the general purpose computing language into a library usable by a plurality of calls from the object code of the virus detection section.

17. A method according to claim 15, further comprising:
providing operations specified in the general purpose programming language to handle at least one of interrupts, exceptions and platform-dependent application programming interface callbacks.

18. A method according to claim 15, further comprising:
maintaining source virus definitions, each comprising source code specified in the general purpose programming language.

19. A method according to claim 18, wherein the general purpose programming language is the C programming language.

20. A method according to claim 15, further comprising:
associating at least one virus name with each virus definition record; and
indexing the virus definition records in the virus data file by the at least one virus name.

21. A method according to claim 15, further comprising:
accessing at least one of a file or attachment on the computer system for each virus definition record.

22. A method according to claim 15, further comprising:
detecting an infection of the computer system by the identified computer virus by executing the virus definition string for each accessed virus definition record.

23. A method according to claim 15, further comprising:
detecting an infection of the computer system by the identified computer virus by executing the object code of the extension sentence for each accessed virus definition record.

24. A method according to claim 15, further comprising:
providing a virus removal section comprising object code providing operations to neutralize the identified computer virus.

25. A method according to claim 24, further comprising:
performing at least one of a removal and disablement of the identified computer virus upon the infection of the computer system by executing the virus removal section for each accessed virus definition record.

26. A method according to claim 15, further comprising:
performing at least one of a removal and disablement of the identified computer virus upon the infection of the computer system by executing the object code of the extension sentence for each accessed virus definition record.

27. A method according to claim 15, further comprising:
storing one or more virus definitions, each virus definition comprising source code written in an anti-virus language, the source code comprising:
  instructions to detect the identified computer virus within a computer system; and
  instructions for at least one of removing the identified computer virus from and disabling the identified computer virus on the computer system; and
converting the virus definitions into the object code comprised in the virus detection section and the virus removal section.

28. A method according to claim 15, further comprising:
storing one or more virus definitions, each virus definition comprising source code written in a general purpose computing language, the source code comprising at least one of:
  instructions to detect the identified computer virus within a computer system; and
  instructions for at least one of removing the identified computer virus from and disabling the identified computer virus on the computer system; and
converting the virus definitions into the object code of the extension sentence.

29. A computer-readable storage medium holding code for performing the method of claim 15, 16, 17, 18, 20, 21, 22, 23, 24, 25, 26, 27 or 28.

* * * * *